US005 United States Patent [19]
Keith et al.

[11] 3,727,402
[45] Apr. 17, 1973

[54] HYDROSTATIC TRANSMISSION SPEED AND STEERING CONTROL SYSTEM

[75] Inventors: Errol W. Keith, Marshall; Jack Watson, Tekonsha; Edward J. Bojas, Marshall, all of Mich.

[73] Assignee: Eaton Corporation, Cleveland, Ohio

[22] Filed: June 30, 1971

[21] Appl. No.: 158,455

[52] U.S. Cl. .................60/444, 180/6.48, 60/471
[51] Int. Cl. .........................................F15b 13/06
[58] Field of Search ..............60/19, 53 A, 53 R, 60/52 S; 180/6.48, 66 R; 91/414, 437

[56] References Cited

UNITED STATES PATENTS

| | | | |
|---|---|---|---|
| 2,941,609 | 6/1960 | Bowers et al. | 60/53 R X |
| 3,114,424 | 12/1963 | Voreaux et al. | 60/53 A X |
| 3,194,017 | 7/1965 | Weisenbach | 60/53 A X |
| 3,540,220 | 11/1970 | Lauck | 60/19 |

Primary Examiner—Edgar W. Geoghegan
Attorney—Yount and Tarolli

[57] ABSTRACT

An improved apparatus for controlling the operation of a plurality of hydrostatic transmissions includes a plurality of fluid motors which are connected with the hydrostatic transmissions and are operable to vary the speed and direction of operation of the hydrostatic transmissions. A speed control and reversing valve is operable to effect contemporaneous operation of each of the fluid motors to increase or decrease the operating speeds of the hydrostatic transmissions by the same amount. Steering control valves are connected between the speed control valve and the fluid motors. These steering control valves are operable to effect a change in the speed of a selected one or both of the hydrostatic transmissions to thereby change the direction of movement of an associated vehicle. Upon operation of one of the steering valves, opposite sides of a piston in the associated fluid motor are connected in fluid communication to effect operation of the fluid motor and a variation in the swash angle of the associated hydrostatic transmission.

22 Claims, 4 Drawing Figures

HYDROSTATIC TRANSMISSION SPEED AND STEERING CONTROL SYSTEM

This invention relates generally to a new and improved apparatus for controlling the operation of a plurality of hydrostatic transmissions and more specifically to a control apparatus which includes speed and steering control valves for varying the speed of either a selected one or all of the hydrostatic transmissions.

There are many known vehicles which include a pair of hydrostatic transmissions which are operable to transmit power from an engine to associated drive tracks. When the vehicle is to be driven straight ahead, the hydrostatic transmissions and the drive tracks are driven at the same speed. When the vehicle is to be turned, the output speed of the hydrostatic transmission associated with one of the tracks is reduced. If a sharp turning of the vehicle is to be effected, the direction of operation of this hydrostatic transmission may even be reversed to change the direction of movement of the associated drive track.

There are many different types of known control systems for controlling the speed and direction of operation of a plurality of hydrostatic transmissions. One example of such a control system is set forth in U.S. Pat. No. 3,306,385. All of these known control systems have, to a greater or lesser extent, been somewhat unsatisfactory in that they do not have the necessary speed and preciseness of response, simplicity of construction, and durability to perform satisfactorily in many different types of environments. This is particularly true when the control systems are utilized with a pair of hydrostatic transmissions which should be operated at the same speed when the vehicle is moving forwardly and should be quickly and precisely adjustable to operate at different speeds to effect a turning of the vehicle.

The present invention provides an improved apparatus for controlling the operation of a plurality of hydrostatic transmissions and includes a speed control and reversing valve which is operable to contemporaneously effect equal variations in the output speeds of a plurality of hydrostatic transmissions by effecting operation of a plurality of fluid motors. A plurality of steering control valves are provided in hydraulic circuitry interconnecting the motors and the speed control valve. The steering control valves are selectively actuatable to operate one of the motors to vary the output speed of one of the hydrostatic transmissions while maintaining the output speed of another hydrostatic transmission constant. Upon operation of a steering control valve, opposite sides of a piston in the associated fluid motor are connected in fluid communication with each other to effect operation of the fluid motor and associated hydrostatic transmission toward a neutral condition. The steering control valve is also operable to reverse the pressures to which the opposite sides of the piston are exposed to effect a reversal in the direction of operation in the associated hydrostatic transmission and a sharp turning of the vehicle.

Accordingly, it is an object of this invention to provide a new and improved apparatus for controlling the operation of a plurality of hydrostatic transmissions and wherein the apparatus is relatively durable, simple in construction, and quickly and precisely responsive to actuation of control valves to effect a change in the speed of one or more hydrostatic transmissions.

Another object of this invention is to provide a new and improved apparatus for controlling the operation of a plurality of hydrostatic transmissions which includes a plurality of fluid motors each of which is associated with one of the hydrostatic transmissions and wherein a plurality of steering valves are connected in fluid communication with the fluid motors, each of the steering valves being operable to connect a chamber portion on one side of a piston in the associated fluid motor in fluid communication with a chamber portion on the opposite side of the piston to effect movement of the piston and a variation in the output speed of the associated hydrostatic transmission.

Another object of this invention is to provide a new and improved apparatus in accordance with the next preceding object and wherein the apparatus includes a speed control valve for effecting contemporaneous operation of each of the fluid motors to vary the output speeds of the hydrostatic transmissions by substantially the same amount, the steering control valves being located in hydraulic circuitry extending between the speed control valve and the fluid motors.

Another object of this invention is to provide a new and improved apparatus for controlling the operation of a plurality of hydrostatic transmissions and including a plurality of fluid motors each of which is operable to vary the output speed of an associated hydrostatic transmission and hydraulic control means for controlling the operation of these fluid motors, wherein the hydraulic control means includes a speed control valve for effecting contemporaneous operation of each of the plurality of fluid motors to vary the output speeds of the hydrostatic transmissions by substantially the same amount and a plurality of steering control valves for varying the output speeds of a selected hydrostatic transmission relative to another hydrostatic transmission, each of the steering control valves being associated with one of the fluid motors and being connected in fluid circuitry extending between the speed control valve and the associated fluid motors.

Another object of this invention is to provide a new and improved apparatus for controlling the operation of a plurality of hydrostatic transmissions and wherein the apparatus includes a hydraulic actuator assembly for varying the output speeds of a plurality of hydrostatic transmissions, the hydraulic actuator assembly including a plurality of primary fluid motors each of which is operatively connected to an associated one of the hydrostatic transmissions and is operable to vary the output speed of the associated hydrostatic transmission, a plurality of pilot valves each of which is operable to effect operation of the associated one of the primary fluid motors, a plurality of secondary fluid motors each of which is operable to actuate the associated one of the primary fluid motors to vary the output speed of the associated one of the hydrostatic transmissions, and wherein a hydraulic control means is provided for controlling the operation of the hydraulic actuator means, the hydraulic control means including a speed control valve for effecting contemporaneous operation of each of the plurality of secondary fluid motors to vary the output speeds of each of the hydrostatic transmissions by substantially the same amount and steering valves for varying the output speed of the selected hydrostatic transmissions relative to each other, each of the steering valves being operable to effect operation of an associated one of the secondary fluid motors to operate the associated pilot valve and primary fluid motor to vary the output speed of at least one of the hydrostatic transmissions while maintaining the output speed of another of the hydrostatic transmissions substantially constant.

These and other objects and features of the present invention will become more apparent upon a consideration of the following description taken in connection with the accompanying drawings wherein.

Figure 2:
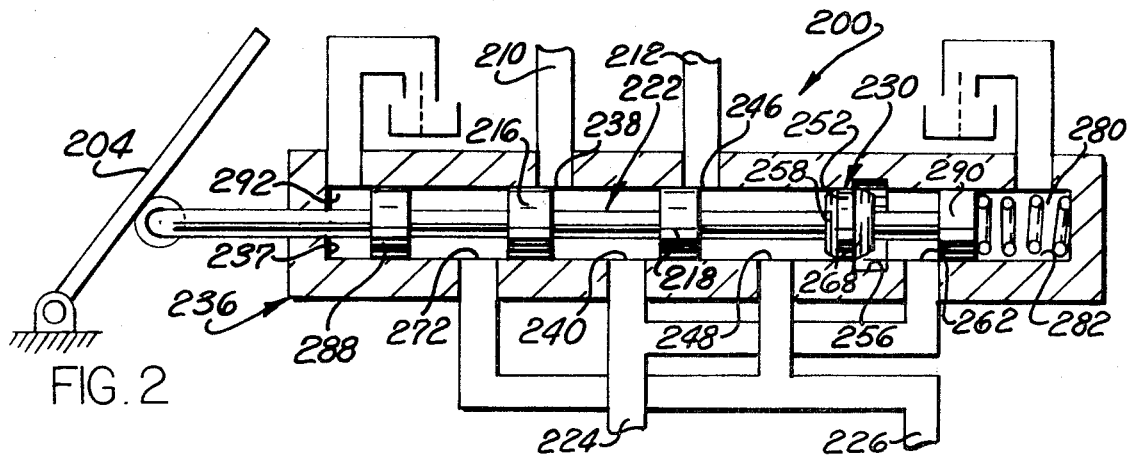
FIG. 2 is a schematic illustration of a steering control valve for varying the output speed of an associated hydrostatic transmission, the steering control valve being shown in a normal or inactive condition in which the steering control valve is ineffective to vary the speed of the associated hydrostatic transmissions.
Figure 3:
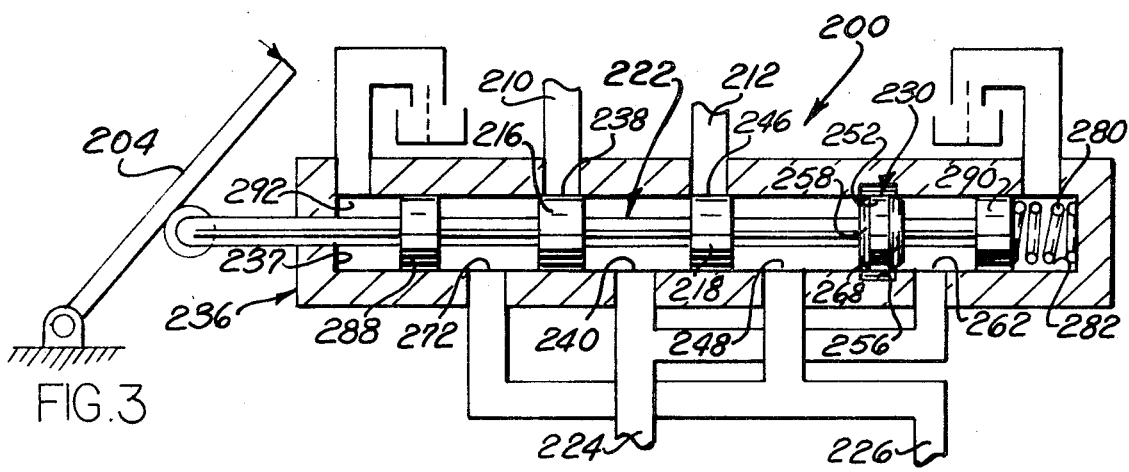
Figure 4:
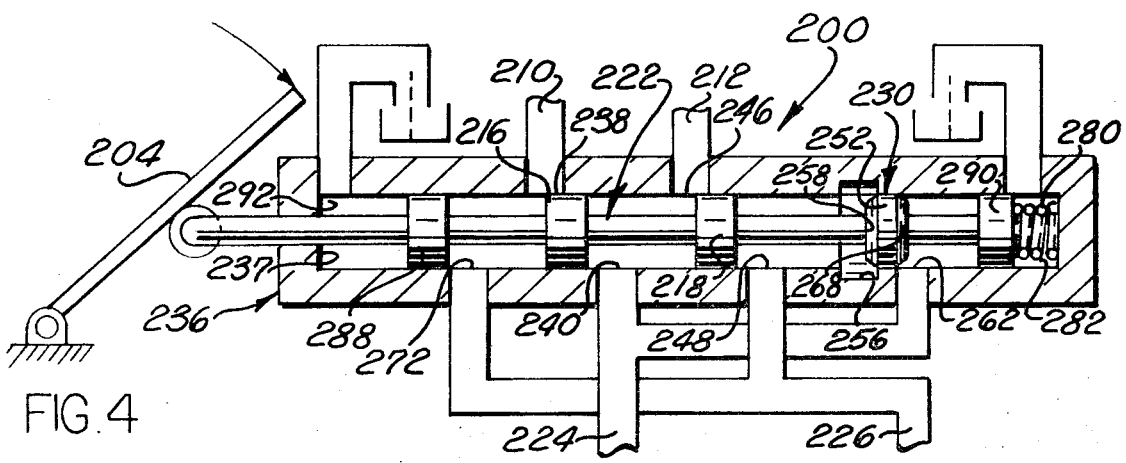

FIG. 3 is a schematic illustration, similar to FIG. 2, illustrating the steering control valve in a partially actuated condition in which the associated hydrostatic transmission is slowed to a neutral condition to effect a turning of the vehicle; and FIG. 4 is a schematic illustration of the steering control valve in a fully actuated condition in which the associated hydrostatic transmission is operated in a reverse direction to effect a sharp turning of the vehicle.

Figure 1:
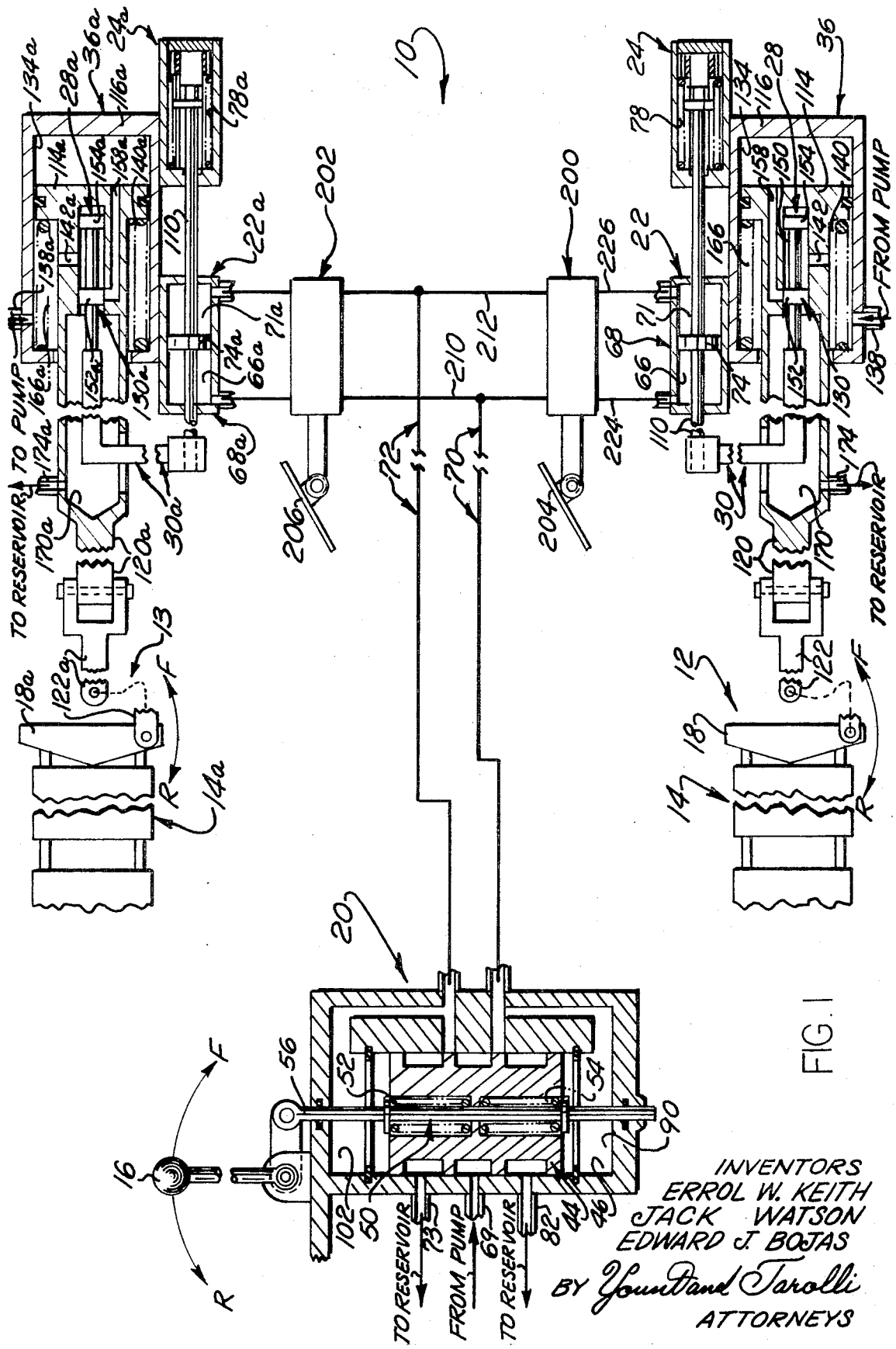
FIG. 1 is a schematic illustration of an apparatus for controlling the operation of a plurality of fluid motors to control the speed and direction of movement of a vehicle under the influence of power transmitted by a plurality of hydrostatic transmissions.

Referring to FIG. 1, a control assembly 10 regulates the speed and direction of operation of a pair of known hydrostatic transmissions 12 and 13 to control the speed and direction of movement of a vehicle which is connected with the hydrostatic transmissions in a known manner. Since the apparatus for regulating the speed and direction of operation of the hydrostatic transmission 12 has the same construction and mode of operation as apparatus for regulating the operation of the hydrostatic transmission 13, similar numerals will be utilized to designate similar parts. The suffix letter *a* is associated with the numerals designating the parts associated with the hydrostatic transmission 13 to avoid confusion.

The swash angles of hydrostatic transmission pump assemblies 14 and 14a are varied by the same amount in response to actuation of a speed control lever or joy stick 16. Movement of the speed control lever 16 forwardly (to the right as viewed in FIG. 1) from the illustrated neutral position results in the swash plates 18 and 18a of the pump assemblies 14 and 14a being moved to effect forward operation of the hydrostatic transmissions 12 and 13 at the same speed. The common speed of operation of the hydrostatic transmissions 12 and 13 is proportional to the extent of forward movement of the speed control lever 16. Similarly, movement of the speed control lever 16 in the reverse direction (that is, toward the left as viewed in FIG. 1) from the neutral position results in the swash plates 18 and 18a being moved equally to effect operation of the hydrostatic transmissions 12 and 13 rearwardly at the same speed which is proportional to the extent of rearward movement of the speed control lever.

When the speed control lever 16 is moved either forwardly or rearwardly from its neutral position, a speed control valve assembly 20 activates slave or secondary motor assemblies 22 and 22a to the same extent against the influence of double acting spring assemblies 24 and 24a. Activation of the secondary motor assemblies 22 and 22a operates pilot valves 28 and 28a by means of a linkages 30 and 30a. Operation of the pilot valves 28 and 28a activates main or primary fluid motors 36 and 36a to vary the swash angles of the hydrostatic transmissions 12 and 13 to the same extent.

The speed control valve assembly 20 is operated in response to movement of the speed control lever 16 to provide a modulated flow of fluid under pressure to the secondary fluid motors 22 and 22a. The control valve assembly 20 includes a speed valve member 44 which is slidably mounted in a chamber 46. The speed valve member 44 is connected to the speed control lever 16 by a spring assembly 50 having springs 52 and 54 which engage seats or stops fixedly connected to an actuator shaft 56 and seats or shoulders on the valve member.

The speed valve member 44 is movable in opposite directions, from an initial or neutral position shown in FIG. 1, to either a forward or rearward operated position by movement of the control lever 16. When the valve member 44 is in the neutral position (shown in FIG. 1), the valve member blocks fluid flow to the motor assemblies 22 and 22a. Upon movement of the control lever 16 in a forward direction, the valve member 44 is displaced downwardly from the position shown in FIG. 1 so that first end portions 66 and 66a of motor cylinders or housings 68 and 68a are connected in fluid communication with a pump or other source of fluid under pressure through conduits 69 and 70. The opposite or second ends 71 and 71a of the cylinders 68 and 68a are connected to a reservoir or source of low pressure by conduits 72 and 73. Of course, this results in pistons 74 and 74a in the motors 22 and 22a being displaced toward the right (as viewed in FIG. 1) against the influence of biasing springs 78 and 78a in the double acting spring assemblies 24 and 24a.

This rightward movement (as viewed in FIG. 1) of the pistons 74 and 74a is transmitted by the linkages 30 and 30a to the pilot valves 28 and 28a to effect operation of the primary motors 36 and 36a. The primary motors 36 and 36a then move the swash plates 18 and 18a of the hydrostatic transmissions 12 and 13 in a counterclockwise direction (as viewed in FIG. 1) to thereby increase the output speed of operation of the hydrostatic transmissions by the same amount in a forward direction.

Similarly, upon movment of the speed control lever 16 in the reverse direction (that is, toward the left as viewed in FIG. 1) the actuator shaft 56 moves the speed valve member 44 upwardly (as viewed in FIG. 1). This movment of the valve member 44 communicates the end portions 71 and 71a of the cylinders 68 and 68a with fluid under pressure through conduits 72 and 69. The opposite end portions 66 and 66a of the cylinders 68 and 68a are communicated to reservoir through conduits 72 and 82. The pressure differential across the pistons 74 and 74a moves them toward the left (as viewed in FIG. 1) against the influence of the double acting spring assemblies 24 and 24a. This leftward movement of the pistons 74 and 74a actuates the linkages 30 and 30a and pilot valves 28 and 28a to effect operation of the servomotors 36 and 36a. This operation of the servomotors 36 and 36a moves the swash plates 18 and 18a a clockwise direction (as viewed in FIG. 1) to increase the speed of operation of the hydrostatic transmissions 12 and 13 by the same amount in the reverse direction.

When the pistons 74 and 74a are moved toward the right (as viewed in FIG. 1) to effect an increase in the forward speed of operation of the hydrostatic transmissions 12 and 13 the resistance exerted by the spring assemblies 24 and 24a increases as the distance which pistons are displaced from the center or neutral positions shown in FIG. 1 increases. Therefore, the pressure in the end portions 66 and 66a of the cylinders 68 and 68a increases to overcome the increasing resistance of the spring assemblies 24 and 24a. This increasing pressure is communicated to a lower end portion 90 of the valve chamber 46. As the fluid pressure in the lower end portion 90 of the valve chamber 46 increases, the valve member 44 is moved upwardly against the influence of the spring 52 to block the flow of fluid to the slave motors 22 and 22a.

The fluid pressure which must be built up in the end portion 90 of the valve chamber 46 to move the valve member 44 from its forward operated position to the initial position of FIG. 1 is proportional to the distance which the actuator shaft 56 is moved downwardly relative to the housing 48 by operation of the speed control lever 16. This proportionality results from the fact that the greater the movement of the actuator shaft 56, the greater is the initial compression of the spring 52 and the pressure which must be built up in the end portion 90 of the chamber 46 to move the valve member 44 against the influence of the spring 52. Accordingly, the greater the movement of the speed control lever 16 from the neutral position of FIG. 1, the greater the distance which the pistons 74 and 74a must be moved to build up sufficient pressure in the end portions 66 and 66a of the cylinder 68 and 68a to move the valve member 44 upwardly against the force of the compressed spring 52 to the initial position of FIG. 1. This movement of the pistons 74 and 74a actuates the linkages 30 and 30a and pilot valves 28 and 28a to effect a proportional variation in the output speed of the hydrostatic transmissions 12 and 13.

When the valve member 44 is moved to a reverse operated position, that is upwardly as viewed in FIG. 1, the conduit 72 is connected in fluid communication with a pump or other source of fluid to thereby increase the fluid pressure in the end portions 71 and 71a of the cylinders 68 and 68a. This results in the pistons 74 and 74a being moved toward the left (as viewed in FIG. 1) with a compressing of the spring assemblies 24 and 24a. The increasing fluid pressure in the end portions 71 and 71a of the cylinders 68 and 68a is communicated to the upper end portion 102 of the valve chamber 46 to urge the valve member 44 downwardly toward the neutral position of FIG. 1. The fluid pressure required to move the valve member 44 to the neutral position is proportional to the distance which the speed control member 16 was moved in the reverse direction and the extent of compression of the spring 54.

From the foregoing description, it can be seen that the pistons 74 and 74a of the slave motors 22 and 22a are moved through distances which are porportional to the distance which the speed control lever 16 is moved in either the forward or reverse directions. This movement of the pistons 74 and 74a is transmitted to the pilot valves 28 and 28a in the servomotors 36 and 36a by the linkages 30 and 30a. The servomotors 36 and 36a are then operated to pivot the swash plates 18 and 18a of the pumps 14 and 14a through distances which are proportional to the extent of movement of the pistons 74 and 74a and the extent of movement of the speed control lever 16. Once the primary motors 36 and 36a have been operated to an extent corresponding to the extent of movement of the speed control lever 16, the hydrostatic transmissions 12 and 13 have the same output speeds in the same direction to move a vehicle along a straight path. The operation of the speed control valve 20 and its relationship to the fluid motors 22 and 22a and spring assemblies 24 and 24a is more fully set forth in U.S. Pat. No. 3,540,220 to Robert D. Lauck and entitled "Hydrostatic Transmission Control System". In order to avoid prolixity of description, the disclosure in that patent should be considered as being incorporated herein by this reference thereto.

The pilot valve 28 directs a flow of fluid to move a piston 114 in a cylinder 116 of the servomotor 36 through the same distance and in the same direction as in which the piston 74 in the slave cylinder assembly 22 is moved upon actuation of the speed control lever 16. Since the piston 74 moves through a distance which is proportional to the distance which the speed control lever 16 is moved, the piston 114 is also moved through a distance which is proportional to the distance which the control lever 16 is moved. The piston 114 is connected with the swash plate 18 of the pump 14 by a piston rod 120 and a suitable linkage arrangement 122. Therefore, movement of the piston 114 results in the swash angle of the pump 14 being changed by an amount which is proportional to the extent of movement of the speed control lever 16. Of course, varying the swash angle of the pump 14 results in a proportional variation in the operating speed of the hydrostatic transmission.

When the speed control lever 16 is moved in the reverse direction, the piston 74 moves toward the left (as viewed in FIG. 1). This movment of the piston 74 is transmitted to a movable valve element or spool 130 of the pilot valve 28 by piston rod 110 and linkage 30. Leftward movement (as viewed in FIG. 1) of the valve spool 130 results in relatively high pressure fluid being directed into the head end portion 134 of the cylinder 116 to move the piston 114 toward the left (as viewed in FIG. 1).

Movement of the valve spool 130 toward the left (as viewed in FIG. 1) results in the piston 114 being moved toward the left through the same distance as which the valve spool is moved. Thus, when the valve spool 130 is moved toward the left, high pressure from a supply line 138 flows from the rod end portion 140 of the servomotor cylinder 116 through a passage 142 to a central portion 150 formed between annular lands 152 and 154 of the valve spool 130. Since the valve spool 130 has been displaced to the left from the initial position illustrated in FIG. 1 by operation of the slave cylinder assembly 22, the valve land 152 is displaced to the left of the entrance to a passage 158 connected with the head end portion 134 of the cylinder 116. Therefore, high pressure fluid from the supply line 138 flows into the head end portion 134 of the cylinder 116 and applies pressure against the relatively large head end face of the piston 114 to move the piston toward the left (as viewed in FIG. 1) in the cylinder.

As the piston 114 moves toward the left, the valve land 152 will again block a flow of fluid through the passage 158 when the piston 114 has moved through the same distance as which the valve spool 130 is moved by the leftward movement of the piston 74 of the slave cylinder assembly 22. When the valve land 152 blocks the flow of fluid through the passage 158, high pressure is no longer conducted to the head end 134 of the cylinder 116 and the leftward movement of the piston 114 ceases. Thus, the pistons 74 and 114 are moved through the same distance when the speed control lever 16 is moved in the reverse direction.

Similarly, when the speed control lever 16 is moved forwardly to increase the forward operating speed of the hydrostatic transmissions 12 and 13, the pistons 74 and 114 are moved through equal distances toward the right (as viewed in FIG. 1) to effect a change in the angular position of the swash plate 18 by an amount which is proportional to the extent of forward movement of the speed control lever 16. This is accomplished by venting the head end portion 134 of the cylinder 116 to a source of pressure or reservoir so that the piston 114 is moved toward the right (as viewed in FIG. 1) under the combined influence of a return spring 166 and relatively high fluid pressure in the rod end portion 140 of the cylinder 116. Of course, this results in the swash angle of the hydrostatic transmission 12 being changed by a proportional amount to increase the operating speed of the hydrostatic transmission in the forward direction.

Accordingly, upon operation of the speed control lever 16 in the forward direction, the piston 74 of the slave cylinder assembly 22 is moved toward the right (as viewed in FIG. 1) in the cylinder 68. This rightward movement is transmitted to the spool 130 of the pilot valve 28 by the linkage 30. Rightward movement of the valve spool 130 moves the land 152 to the right of the entrance to the passage 158. This results in the head end portion 134 of the cylinder 116 being connected with the interior of the hollow piston rod 120 through the passage 158. The interior of the hollow piston rod 120 is enclosed within a housing which is connected in communication with the fluid reservoir. Therefore, high pressure fluid can flow from the head end portion 134 of the cylinder 116 through the passages 158 and 170 to a passage 174 and from there to the interior of the housing and the fluid reservoir. Of course, this results in the fluid pressure in the head end portion 134 of the cylinder 116 being decreased.

When the fluid pressure in the head end portion 134 of the cylinder 116 is decreased, the piston 114 is moved toward the right (as viewed in FIG. 1) under the influence of the return spring 166 and high pressure fluid in the rod end portion 140 of the cylinder 116. This rightward movement of the piston 114 continues until the land 152 of the valve spool 130 again blocks the entrance to the passage 158. When the land 152 blocks the entrance of the passage 158, fluid can no longer flow from the head end portion of the cylinder 116 and the rightward movement of the piston 114 ceases. Of course, this rightward movement of the piston 114 is transmitted by the linkage arrangement 122 to the swash plate 18 of the pump 14 to change its swash angle in a direction to increase the forward operating speed of the hydrostatic transmission 12.

The secondary or slave motor 22a actuates the pilot valve 28a by movement of the piston 74a in the same manner as in which the motor 22 actuates the pilot valve 28 upon movement of the piston 74. The primary motor 36a is of the same construction as the primary motor 36. Therefore, operation of the secondary motor 22a results in a change in the swash angle of the pump 14a in the same manner as previously explained in connection with the pump 14. Accordingly, it is belived that it will be apparent that the primary and secondary motors 36a and 22a cooperate in the same manner as do the primary and secondary motors 36 and 22. Therefore, in order to avoid prolixity of description, the specific cooperation between the motors 22a and 36a will not be further described herein.

In accordance with the present invention, a plurality of steering control valves 200 and 202 are provided in the hydraulic circuitry between the fluid motors 22 and 22a and speed control valve 20 to effect a variation in output speed of a selected one of the hydrostatic transmissions 12 or 13 relative to the other hydrostatic transmission. Of course, varying the speed of one of the hydrostatic transmissions 12 or 13 results in a change in the speed of the associated crawler track and a turning of the vehicle. Thus, upon actuation of the steering control valve 200, the fluid motor 22 is operated to decrease the output speed of the hydrostatic transmission 12 and effect a turning of the vehicle toward the crawler track (not shown) associated with the hydrostatic transmission 12, that is toward the right as viewed in FIG. 1. Similarly, actuation of the steering control valve 202 operates the fluid motor 22a to effect a reduction in the output speed of the hydrostatic transmission 13 and the turning of the vehicle in the direction of the crawler track (not shown) associated with the hydrostatic transmission 13. The steering control valves 200 and 202 are of identical construction and are advantageously activated by means of right and left foot pedals 204 and 206.

When the steering control valve 200 is in its normal or inactive position (shown in FIG. 2), the steering control valve 200 is ineffective and the speed of operation of the hydrostatic transmission 12 is determined by the position of the speed control lever 16. When the steering control valve 200 is in the partially actuated position of FIG. 3, fluid flowing to the steering control valve 200 through the conduit sections 210 and 212 from the speed control valve 20 (see FIG. 1) is blocked by lands 216 and 218 on valve spool 222 (FIG. 3). In addition, conduit sections 224 and 226 are connected in fluid communication with each other across a metering land 230 on the valve spool 222. This results in operation of the fluid motor 22 to decrease the output speed of the hydrostatic transmission 12 relative to the output speed of the hydrostatic transmission 13.

Interconnecting the conduit sections 224 and 226 across the metering land 230 effects operation of the fluid motor 22 by connecting the cylinder end portions 66 and 71 (FIG. 1) in fluid communication with each other so that the pressure is equalized on opposite sides of the piston 74. When this occurs, the double acting spring assembly 24 returns the piston 74 to the neutral position illustrated in FIG. 1. Of course, returning the piston 74 to the neutral position actuates the pilot valve 28 to return the primary motor 36 and swash plate 18 to their neutral positions. When the primary motor 36 and swash plate 18 have reached their neutral positions, the hydrostatic transmission 14 will stop driving the associated crawler track with a resulting turning of the vehicle in the direction of this crawler track.

The steering control valve 200 is operable to effect a sharp turning of the vehicle by reversing the direction of operation of the hydrostatic transmission 12. This is accomplished by cross-connecting the conduit sections 210, 212, and 224, 226 as the steering control valve 200 is moved to the fully actuated condition of FIG. 4. Thus, the conduit section 210, which is normally connected with the conduit section 224 when the steering control valve 200 is in the neutral condition (FIG. 2), is connected with the conduit section 226 when the steering control valve 200 is in the fully actuated condition of FIG. 4. Similarly, the conduit 212, which is normally connected with the conduit 226 when the steering control valve 200 is in the neutral position (FIG. 2), is connected in fluid communication with the conduit section 224 when the steering control valve is in the fully actuated position of FIG. 4.

When the steering control valve 200 is moved to the fully actuated condition of FIG. 4, the pressures to which the opposite sides of the piston 74 are exposed are reversed to effect a reversal in the direction of operation of the fluid motor 22 and the primary fluid motor 36. Reversing the direction of operation of the primary fluid motor 36 reverses the direction of operation of the hydrostatic transmission 12 relative to the hydrostatic transmission 13 to effect a sharp turning of the vehicle.

The steering control valve 200 includes a valve housing 236 having a chamber 237 in which the valve spool 222 is slidably mounted. When the valve spool 222 is in its normal or neutral position (FIG. 2) the conduit section 210 is connected in fluid communication through openings 238 and 240 with the conduit section 224. Therefore, if the speed control valve 20 is actuated to effect operation of the hydrostatic transmissions 12 and 13 in the forward direction, the conduit section 210 is connected in fluid communication with a source of high pressure by the speed control valve spool 44 and conduit 69. The high pressure fluid flows from the conduit 210 through the opening 238 to the opening 240 for the conduit section 224. The conduit section 224 conducts this high pressure fluid to the left hand end portion 66 (FIG. 1) of the secondary motor 22. This high pressure fluid causes the piston 74 to move toward the right (as viewed in FIG. 1) to actuate the pilot valve 28 and primary motor 36 to thereby move the swash plate 18 of the hydrostatic transmission 12 to a forward actuated position in the manner previously explained.

Similarly, when the steering control valve 200 is in the neutral position of FIG. 2 and the speed control valve 20 has been actuated to effect forward operation of hydrostatic transmissions 12 and 13, the conduit section 212 is exhausted to drain through the conduit assembly 72, the speed control valve spool 44 and conduit 73. The relatively low pressure in the conduit section 212 is conducted to the end portion 71 of the fluid motor 22. The conduit 212 is connected in fluid communication with the motor 22 through openings 246 and 248, and the conduit section 226. As was previously explained, the exposing of the end portion 71 of the cylinder 68 to a source of low pressure fluid enables the piston 74 to be moved toward the right by the high pressure fluid in the end portion 66 until the effect of this high pressure fluid is overcome by the double acting spring assembly 24.

When it is desired to turn the vehicle by decreasing the output speed of the hydrostatic transmission 12, the steering control valve 200 is actuated by depressing the pedal 204 from the position shown in FIG. 2 toward the position shown in FIG. 3. As the pedal 204 is depressed, the valve spool 222 is moved toward the right. Moving the valve spool toward the right gradually interconnects the end portions 66 and 71 of the cylinder 68 in fluid communication with each other by way of the metering land 230. Thus, as the valve spool 222 is moved toward the right, a sealing section 252 of the metering land 230 is moved into an enlarged annular section 256 formed in the housing 236.

As the circular sealing section 252 moves into the enlarged section 256, fluid flows around a tapered metering surface 258 formed on the metering land 230, through the annular section 256 between an opening 262 leading to the conduit 224 and an opening 248 to the conduit 226. The tapered metering surface 258 provides for a gradual interconnection between the conduit sections 224 and 226 to gradually connect the end portions 66 and 71 of the cylinders 68 in fluid communication with each other. This relatively slow interconnection between the end portions 66 and 71 of the fluid motor 22 results in a gradual actuation of the pilot valve 28 to slowly operate the primary motor 36 to change the swash angle of the hydrostatic transmission 12 without unnecessarily stressing the operating components of the hydrostatic transmission 12. In addition, gradual operation of the valve 28 and motor 36 facilitates controlled variation of the output speed of the hydrostatic transmission 12.

Since the opposite end portions 66 and 71 of the cylinder 68 are connected in fluid communication with each other as the valve spool 222 moves from the inactive position of FIG. 2 to the partially actuated position of FIG. 3, the motor 22 is operated to the neutral condition of FIG. 1 by the double-acting return spring assembly 24. Thus, if the swash plate 18 was angled to operate the hydrostatic transmission 12 in a forward direction, the return spring assembly 24 would move the piston 74 slowly toward the left (as shown in FIG. 1) to effect operation of the primary motor 36 to move the swash plate 18 in a clockwise direction (as seen in FIG. 1) thereby reducing the operating speed of the hydrostatic transmission 12. Of course, if the hydrostatic transmission 12 is being operated in a reverse direction, the double-acting return spring assembly 24 would move the piston 74 to the right to thereby effect operation of the primary motor 36 toward the right to move the swash plate 18 in a counter-clockwise direction (as viewed in FIG. 1) to thereby reduce the output speed of the hydrostatic transmission 12 in the reverse direction.

As the valve spool 222 is moved toward the right (as seen in FIG. 2), the conduit sections 210 and 212 are gradually blocked by the lands 216 and 218. During the period of time in which the conduit sections 224 and 226 are gradually being interconnected across the metering land 230, some fluid may flow between the high and low pressure conduit sections 210 and 212 around the metering land 230. However, if this should occur, the speed control valve 20 is actuated under the influence of the springs 52 or 54 to move the valve spool 44. This operation of the valve spool 44 maintains the fluid pressure in the conduit assemblies 70 and 72 constant so that the fluid motor 22a (see FIG. 1) is not activated and the speed of operation of hydrostatic transmission 13 remains constant.

Upon movement of the valve spool 222 to the neutral or partially actuated position of FIG. 3, the conduit sections 224 and 226 are interconnected across the tapered metering land 230 by way of the openings 248 and 262. Since there is a relatively free flow of fluid between the conduit sections 224 and 226 when the valve spool 222 is in the neutral position of FIG. 3, the lands 216 and 218 completely block fluid flow from the conduit sections 210 and 212 to the valve body 236. Therefore, the opposite end portions 66 and 71 of the fluid motor 22 are cross-connected to equalize the pressure on opposite sides of the piston 74 so that the double-acting return spring assembly 24 will move the piston 74 to the neutral position of FIG. 1 with a corresponding movement of the swash plate 18 to its neutral position. Since the spool lands 216 and 218 block the conduits 210 and 212, the speed operation of the hydrostatic transmission 13 is uneffected.

If it is desired to make a very sharp turn, the steering pedal 204 is fully depressed to reverse the operation of the hydrostatic transmission 12 (see FIG. 4). As pedal 204 is depressed, the valve spool 222 is moved further toward the right. As the valve spool moves toward the right, a second tapered metering land 268 gradually decreases the extent of fluid flow between the openings 262 and 248 until the sealing section 252 moves into engagement with the housing 236 to completely block fluid flow between these openings.

As the sealing section 252 moves into sealing engagement with housing 236, the lands 216 and 218 of the valve spool 222 are moved to the right of the openings 238 and 246 for the conduit sections 210 and 212 to reverse the previous connection of these conduit sections to the fluid motor 22. Thus, as the lands 216 and 218 move toward the right, the conduit section 210 is connected in fluid communication with the conduit section 226 through the opening 238 and an opening 272 in the housing 236 (see FIG. 4). Similarly, the conduit section 212 is connected in fluid communication with the conduit section 224 through the openings 246 and 240.

From the foregoing it can be seen that upon movement of the valve spool 222 toward the fully actuated position of FIG. 4, the initial connection between the fluid conduit sections 210 and 212 (FIG. 2) with the conduit sections 224 and 226 is reversed to reverse the direction of operation of the fluid motor 22 and the direction of operation of hydrostatic transmission 12. Thus, the conduit section 212 which was initially connected with the conduit section 226 through the opening 248 (see FIG. 2) is connected with the conduit section 224 through the opening 240 (FIG. 4). Similarly, the conduit section 210 which was initially connected with the conduit section 224 through the opening 240 is connected with the conduit section 226 through the opening 272. By reversing the connections of the conduit sections 210 and 212 with the conduit sections 224 and 226 the pressure differential across the piston 74 and the motor 22 is reversed to reverse the operation of the motor 22. Of course, reversing the operation of the motor 22 reverses the operation of the primary motor 36 and the hydrostatic transmission 12 to effect a sharp turning of the vehicle.

When the steering control pedal 204 is released, a return spring 280 in an end portion 282 of valve housing 236 moves the valve spool 222 back to the initial or inactive position of FIG. 2. Once the valve spool 222 is returned to the initial position, the fluid pressure in the opposite end portions 66 and 71 of the fluid motor 22 is determined by the setting of the speed control member 16 and the fluid pressure in the conduits 210 and 212. Thus, as soon as the steering control pedal 204 is released and the steering control valve 200 returns to its initial position, the hydrostatic transmission 12 again operates in the same direction and at the same speed as the hydrostatic transmission 13 to move the associated vehicle along a straight path.

It should be understood that the steering control valve 202 has the same construction as the steering control valve 200. Therefore, the steering control valve 202 is selectively actuatable to change the speed and direction of operation of the hydrostatic transmission 13 to effect the turning of the vehicle in a direction opposite to that which is effected by actuation of the steering control valve 200. Also, both steering control valves 200 and 202 could be actuated at the same time to change output speeds of the hydrostatic transmissions 12 and 13. Upon releasing both of the control valves 200 and 202 the hydrostatic transmissions 12 and 13 would return to their original operating speeds. Since the construction of the steering control valves 200 and 202 is identical, the steering control valve 202 will not be further described herein.

The valve spool 222 includes sealing lands 288 and 290. These lands seal opposite end portions 292 and 282 of the housing from the conduit sections 210, 212, 224 and 226. The end portions 292 and 282 of the housing 236 are connected with drain or reservoir so that any fluid which may leak past the lands 288 and 290 is exhausted from the housing.

In view of the foregoing description, it can be seen that the apparatus 10 for controlling the operation of the hydrostatic transmissions 12 and 13 includes a pair of fluid motors 22 and 22a which are operatively connected with the hydrostatic transmissions 12 and 13 by the pilot valves 28 and 28a and the primary fluid motors 36 and 36a. The fluid motors 22 and 22a effect operation of the pilot valves 28 and 28a and the primary fluid motors 36 and 36a to vary the speed and direction of operation of the hydrostatic transmissions 12 and 13. A speed control valve 20 is operable to effect contemporaneous operation of each of the fluid motors 22 and 22a to increase or decrease the operating speeds of the hydrostatic transmissions 12 and 13 by the same amount. While the specific preferred embodiment of the invention described herein utilizes a single speed control valve 20, it should be understood that a pair of control valves could be utilized in place of the single speed control valve 20.

The steering control valves 200 and 202 are connected in a hydraulic circuit extending between the speed control valve 20 and the fluid motors 22 and 22a. The steering control valves 200 and 202 are operable to effect a change in speed of one of the hydrostatic transmissions 12 or 13 relative to the other hydrostatic transmission to thereby change the direction of movement of a vehicle which is propelled by power transmitted by the hydrostatic transmissions 12 and 13. Upon operation of one of the steering valves 200 or 202, opposite sides of a piston 74 or 74a in an associated fluid motor 22 or 22a are connected in fluid communication to effect operation of the fluid motor and vary the swash angle of the associated hydrostatic transmission. Although the control assembly 10 is advantageously utilized in association with a pair of hydrostatic transmissions mounted on a vehicle, it should be understood that the control assembly could, if desired, be associated with hydrostatic transmissions in other environments.

Having described a specific preferred embodiment of the invention, the following is claimed:

1. Apparatus for controlling the operation of a plurality of fluid motors each of which has a piston movable in a chamber to vary the output speed of an associated hydrostatic transmission, said apparatus comprising hydraulic control means for controlling the operation of said plurality of fluid motors, said hydraulic control means including a plurality of steering valves connected in fluid communication with said fluid motors, each of said steering valves being associated with at least one of said fluid motors and being operable to connect a chamber portion on one side of the piston in an associated fluid motor in fluid communication with a chamber portion on the opposite side of the piston to effect movement of the piston in the associated fluid motor and a variation in the output speed of the associated hydrostatic transmission.

2. An apparatus as set forth in claim 1 wherein each of said steering valves includes metering means for effecting gradual operation of the associated one of said fluid motors upon operation of the associated steering valve.

3. An apparatus as set forth in claim 1 wherein said hydraulic control means further includes first conduit means for conducting fluid at a first pressure between one of said steering valves and the associated one of said fluid motors and second conduit means for conducting fluid at a second pressure between said one of first steering valves and the associated one of said fluid motors, said one of said steering valves being operable to connect said first fluid conduit means in fluid communication with said second fluid conduit means to thereby effect the connection between the portions of the chamber on opposite sides of the piston in the associated one of said fluid motors.

4. An apparatus as set forth in claim 1 wherein said hydraulic control means further includes speed control valve means for effecting contemporaneous operation of each of said plurality of fluid motors to vary the output speeds of each of the hydrostatic transmissions by substantially the same amount.

5. An apparatus as set forth in claim 4 further including fluid conduit means for conducting fluid between said speed control valve means and said steering valves and for conducting fluid between said steering valves and the chamber portions on oppposite sides of the pistons in said plurality of fluid motors.

6. Apparatus as set forth in claim 5 wherein said fluid conduit means includes a first fluid conduit extending between the chamber portion on one side of the piston of one of said fluid motors, and the associated one of said steering valves and a second fluid conduit extending between the chamber portion on the opposite side of the piston of said one of said fluid motors and the associated one of said steering valves, said steering valve associated with said one of said fluid motors being operable between a first postion blocking fluid communication between said first and second fluid conduits and a second position connecting said first and second fluid conduits in fluid communication with each other to effect a variation in the output speed of the associated hydrostatic transmission.

7. Apparatus for controlling the operation of a plurality of hydrostatic transmissions, said apparatus comprising a plurality of fluid motors each of which is operatively connected with an associated one of the hydrostatic transmissions and is operable to vary the output speed of the associated hydrostatic transmission, and hydraulic control means for controlling the operation of said plurality of fluid motors, said hydraulic control means including speed control valve means for effecting contemporaneous operation of each of said plurality of fluid motors to vary the output speeds of each of the hydrostatic transmissions by substantially the same amount, conduit means for conducting fluid between said speed control valve means and said plurality of fluid motors, and steering control valve means for varying the output speed of selected hydrostatic transmissions relative to each other, said steering control valve means including a plurality of steering valves each of which is associated with one of said fluid motors, and is connected with said conduit means between said speed control valve means and the associated one of said fluid motors, each of said steering valves being operable to effect operation of the associated one of said fluid motors to vary the output speed of at least one of the hydrostatic transmissions while maintaining the output speed of another of the hydrostatic transmissions substantially constant.

8. An apparatus as set forth in claim 7 wherein each of said plurality of fluid motors includes housing means for defining a chamber and a piston slidably disposed in said chamber, each of said steering valves being operable to connect a portion of the chamber on a first side of the piston in the associated one of said fluid motors in fluid communication with a portion of the chamber on a second side of the piston in the associated one of said fluid motors to effect operation of the associated one of said fluid motors.

9. An apparatus as set forth in claim 8 wherein each of said steering valves includes metering means for gradually connecting the portion of the chamber on the one side of the piston in fluid communication with the portion of the chamber on the other side of the piston upon operation of the associated one of said steering valves.

10. An apparatus as set forth in claim 7 wherein the direction of operation of the hydrostatic transmissions is reversible, each of said steering valves being selectively operable to operate the associated one of said fluid motors to reverse the direction of operation of the associated one of the hydrostatic transmissions.

11. An apparatus as set forth in claim 7 wherein said conduit means includes first and second fluid passage means for connecting said speed control valve means in fluid communication with each of said steering valves, and third and fourth fluid passage means for connecting one of said steering control valves with the associated one of said fluid motors, said speed control valve means being selectively operable to provide a first fluid pressure in said first fluid passage means and a second fluid pressure in said second fluid passage means, said one of said steering control valves being selectively operable between a first condition in which said third fluid passage means is exposed to the fluid pressure in said first fluid passage means and said fourth fluid passage means is exposed to the fluid pressure in said second fluid passage means and a second condition in which said third fluid passage means is exposed to the fluid pressure in said second fluid passage means and said fourth fluid passage means is exposed to the fluid pressure in said first fluid passage means.

12. An apparatus as set forth in claim 11 wherein said speed control valve means includes means for maintaining the fluid pressure in said first and second fluid passage means substantially constant during operation of said one of said steering control valves between the first and second conditions.

13. An apparatus as set forth in claim 12 wherein said one of said steering valves blocks fluid communication between said first and second fluid passage means and between said third and fourth fluid passage means when said one of said steering valves is in said first condition and connects all of said fluid passage means in fluid communication with each other when said one of said steering valves is in said second condition.

14. An apparatus as set forth in claim 12 wherein said one of said steering valves blocks fluid communication between said first and second fluid passage means and between said third and fourth fluid passage means when said one of said steering valves is in said first condition and when said one of said steering valves is in said second condition.

15. An apparatus as set forth in claim 14 wherein said one of said steering valves connects all of said fluid passage means in fluid communication with each other as said one of said steering valves is operated between said first and second conditions.

16. An apparatus as set forth in claim 7 wherein each of said fluid motors includes a housing defining a chamber having first and second end portions and a piston disposed in said chamber and movable toward and away from said first and second end portions of said chamber, said apparatus further including means for operatively connecting each of said pistons with an associated one of the hydrostatic transmissions in such manner that movement of one of said pistons varies the output speed of the associated one of the hydrostatic transmissions, said conduit means including first and second fluid passage means for connecting said speed control valve means in fluid communication with each of said steering valves, third fluid passage means for connecting one of said steering control valves in fluid communication with the first end portion of one of said chambers, and fourth fluid passage means for connecting said one of said steering control valves in fluid communication with said second end portion of said one of said chambers, said one of said steering control valves being selectively operable between first and second conditions, said one of said steering control valves when in said first condition connecting said third fluid passage means and said first end portion of said one of said chambers in fluid communication with said first fluid passage means and said fourth fluid passage means and said second end portion of said one of said chambers in fluid communication with said second fluid passage means, said one of said steering control valves when in said second condition connecting said third fluid passage means and said first end portion of said one of said chambers in fluid communication with said second fluid passage means and said fourth fluid passage means and said second end portion of said one of said chambers in fluid communication with said first fluid passage means to thereby effect movement of said piston in said one of chambers and a variation in the output speed of the associated hydrostatic transmission upon operation of said one of said steering valves between the first and second conditions.

17. Apparatus for controlling the operation of a hydrostatic transmission, said apparatus comprising hydraulic actuator means for varying the output speed of the hydrostatic transmission, said hydraulic actuator means including a primary fluid motor which is operatively connected with the hydrostatic transmission and is operable to vary the output speed of the hydrostatic transmission, pilot valve which is connected in fluid communication with said primary fluid motor and is operable to effect operation of said primary fluid motor, and a secondary fluid motor which is operatively connected with said pilot valve and is operable to actuate said pilot valve to thereby effect operation of said primary fluid motor to vary the output speed of the hydrostatic transmission, and hydraulic control means for controlling the operation of said hydraulic actuator means, said hydraulic control means including speed control valve means movable to any one of a plurality of positions to effect operation of said secondary fluid motor to vary the output speed of the hydrostatic transmission, conduit means for conducting fluid between said speed control valve means and said secondary fluid motor, and secondary control valve means for varying the output speed of the hydrostatic transmission while maintaining said speed control valve means in a selected operating position, said secondary control valve means including a secondary valve connected in fluid communication with said conduit means, said secondary valve being associated with said secondary fluid motor and being operable to effect operation of said secondary fluid motor to operate said pilot valve and primary fluid motor to vary the output speed of the hydrostatic transmission.

18. Apparatus as set forth in claim 17 wherein said secondary control valve is connected with said conduit means between said speed control valve means and said secondary fluid motor.

19. An apparatus as set forth in claim 18 wherein said secondary fluid motor includes a housing defining a chamber having a first and second end portion and a piston disposed in said chamber and movable toward and away from said first and second end portions of said chamber, said conduit means including first fluid passage means for connecting said speed control valve means in fluid communication with the first end portion of said chamber, second fluid passage means for connecting said secondary control valve in fluid communication with said first end portion of said chamber, and third fluid passage means for connecting said secondary control valve in fluid communication with said second end portion of said chamber, said secondary control valve being selectively operable between first and second conditions, said secondary control valve when in said first condition connecting said second fluid passage means and said first end portion of said chamber in fluid communication with said first fluid passage means, said secondary control valve when in said second condition connecting said third fluid passage means and said second end portion of said chamber in fluid communication with said first fluid passage means to thereby effect movement of said piston in said chamber and movement of said pilot valve to effect operation of said primary fluid motor and a variation in the output speed of the hydrostatic transmission upon operation of said secondary valve between the first and second conditions.

20. Apparatus for controlling the operation of a plurality of hydrostatic transmissions, said apparatus comprising hydraulic actuator means for varying the output speeds of the plurality of hydrostatic transmissions, said hydraulic actuator means including a plurality of primary fluid motors each of which is operatively connected with an associated one of the hydrostatic transmissions and is operable to vary the output speed of the associated hydrostatic transmission, a plurality of pilot valves each of which is connected in fluid communication with an associated one of said primary fluid motors and is operable to effect operation of the associated one of said primary fluid motors, and a plurality of secondary fluid motors each of which is operatively connected with an associated one of said pilot valves and is operable to actuate the associated one of said pilot valves to thereby effect operation of the associated one of said primary fluid motors to vary the output speed of the associated one of the hydrostatic transmissions, and hydraulic control means for controlling the operation of said hydraulic actuator means, said hydraulic control means including speed control valve means for effecting contemporaneous operation of each of said plurality of secondary fluid motors to vary the output speeds of each of the hydrostatic transmissions by substantially the same amount, conduit means for conducting fluid between said speed control valve means and said plurality of secondary fluid motors, and steering control valve means for varying the output speed of selected hydrostatic transmissions relative to each other, said steering control valve means including a plurality of steering valves each of which is associated with one of said secondary fluid motors and is connected with said conduit means between said speed control valve means and the associated one of said secondary fluid motors, each of said steering valves being operable to effect operation of the associated one of said secondary fluid motors to operate the associated pilot valve and primary fluid motor to vary the output speed of at least one of the hydrostatic transmissions while maintaining the output speed of another of the hydrostatic transmissions substantially constant.

21. An apparatus as set forth in claim 20 wherein each of said secondary fluid motors includes a housing defining a chamber having first and second end portions and a piston disposed in said chamber and movable toward and away from said first and second end portions of said chamber, said conduit means including first and second fluid passage means for connecting said speed control valve means in fluid communication with each of said steering valves, third fluid passage means for connecting one of said steering control valves in fluid communication with the first end portion of one of said chambers, and fourth fluid passage means for connecting said one of said steering control valves in fluid communication with said second end portion of said one of said chambers, said one of said steering control valves being selectively operable between first and second conditions, said one of said steering control valves when in said first condition connecting said third fluid passage means and said first end portion of said one of said chambers in fluid communication with said first fluid passage means and said fourth fluid passage means and said second end portion of one of said chambers in fluid communication with said second fluid passage means, said one of said steering control valves when in said second condition connecting said third fluid passage means and said first end portion of said one of said chambers in fluid communication with said second fluid passage means and said fourth fluid passage means and said second end portion of said one of said chambers in fluid communication with said first fluid passage means to thereby effect movement of said piston in said one of said chambers and movement of the associated one of said pilot valves to effect operation of the associated one of said primary fluid motors and a variation in the output speed of the associated hydrostatic transmission upon operation of said one of said steering valves between the first and second conditions.

22. An apparatus as set forth in claim 7 wherein said speed control valve means includes means for controlling the fluid pressure conducted through said conduit means to said plurality of fluid motors, each of said fluid motors including pressure responsive means for effecting operation of the associated one of said fluid motors to an extent which varies as a function of variations in the fluid pressure conducted to the associated one of said fluid motors through said conduit means, each of said steering valves being selectively operable to vary the fluid pressure conducted to the associated one of said fluid motors to effect operation of the associated one of the fluid motors without operating said speed control valve means.

\* \* \* \* \*